Oct. 10, 1961 J. P. HAMILTON Re. 25,050
STACKING PAPERBOARD TRAY
Original Filed Aug. 7, 1956 5 Sheets-Sheet 1
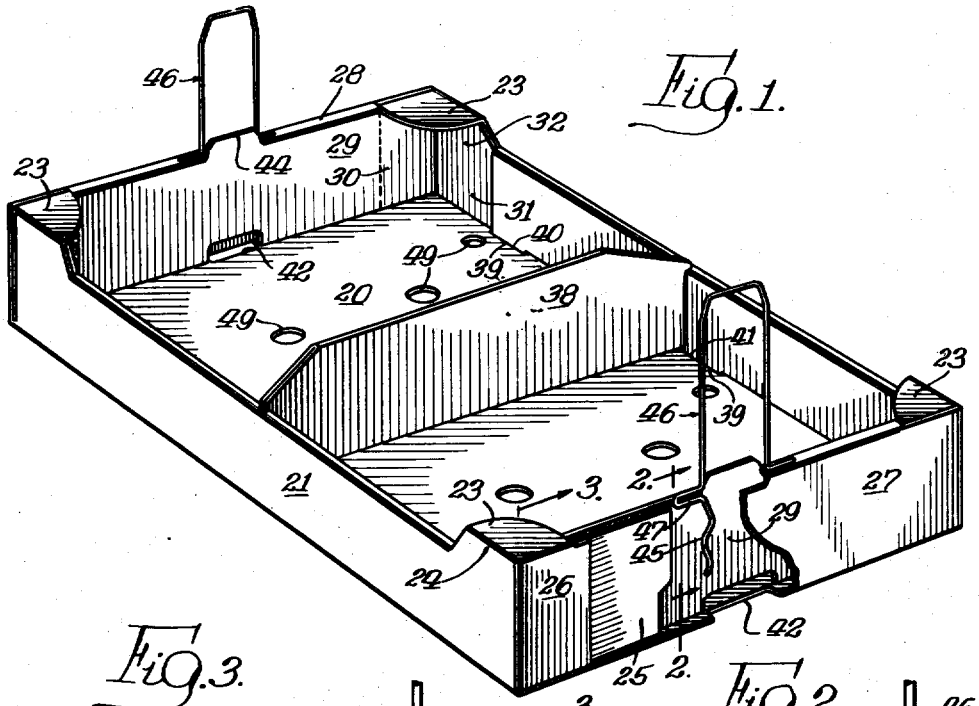
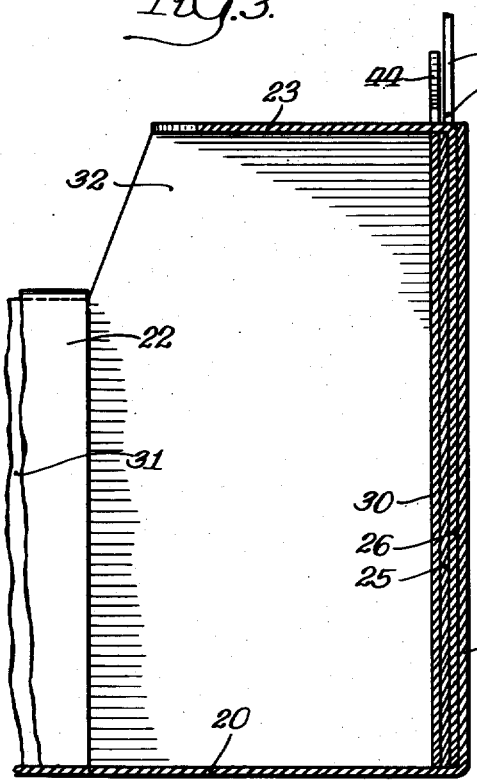
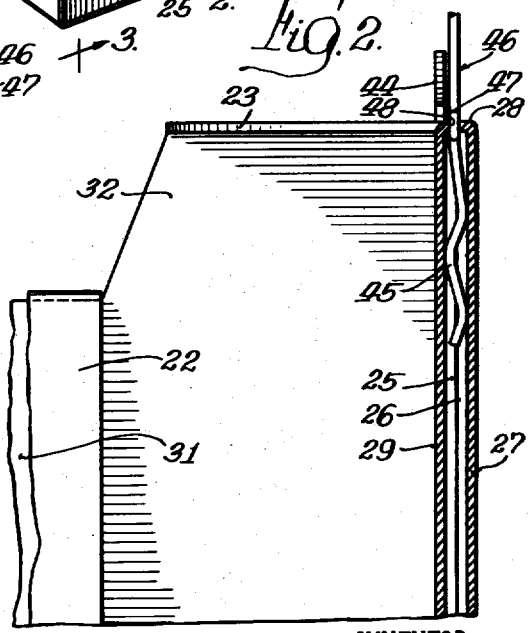
INVENTOR.
Joseph Portola Hamilton,
BY
Brown, Jackson, Boettcher + Dienner,
Attys.

Oct. 10, 1961 J. P. HAMILTON Re. 25,050

STACKING PAPERBOARD TRAY

Original Filed Aug. 7, 1956 5 Sheets-Sheet 2

INVENTOR.
Joseph Portola Hamilton,
BY
Brown, Jackson, Boettcher & Dienner
Attys.

STACKING PAPERBOARD TRAY

Original Filed Aug. 7, 1956 5 Sheets-Sheet 3

INVENTOR.
Joseph Portola Hamilton,
BY
Brown, Jackson, Boettcher & Dienner,
Attys.

STACKING PAPERBOARD TRAY
Original Filed Aug. 7, 1956 5 Sheets-Sheet 4
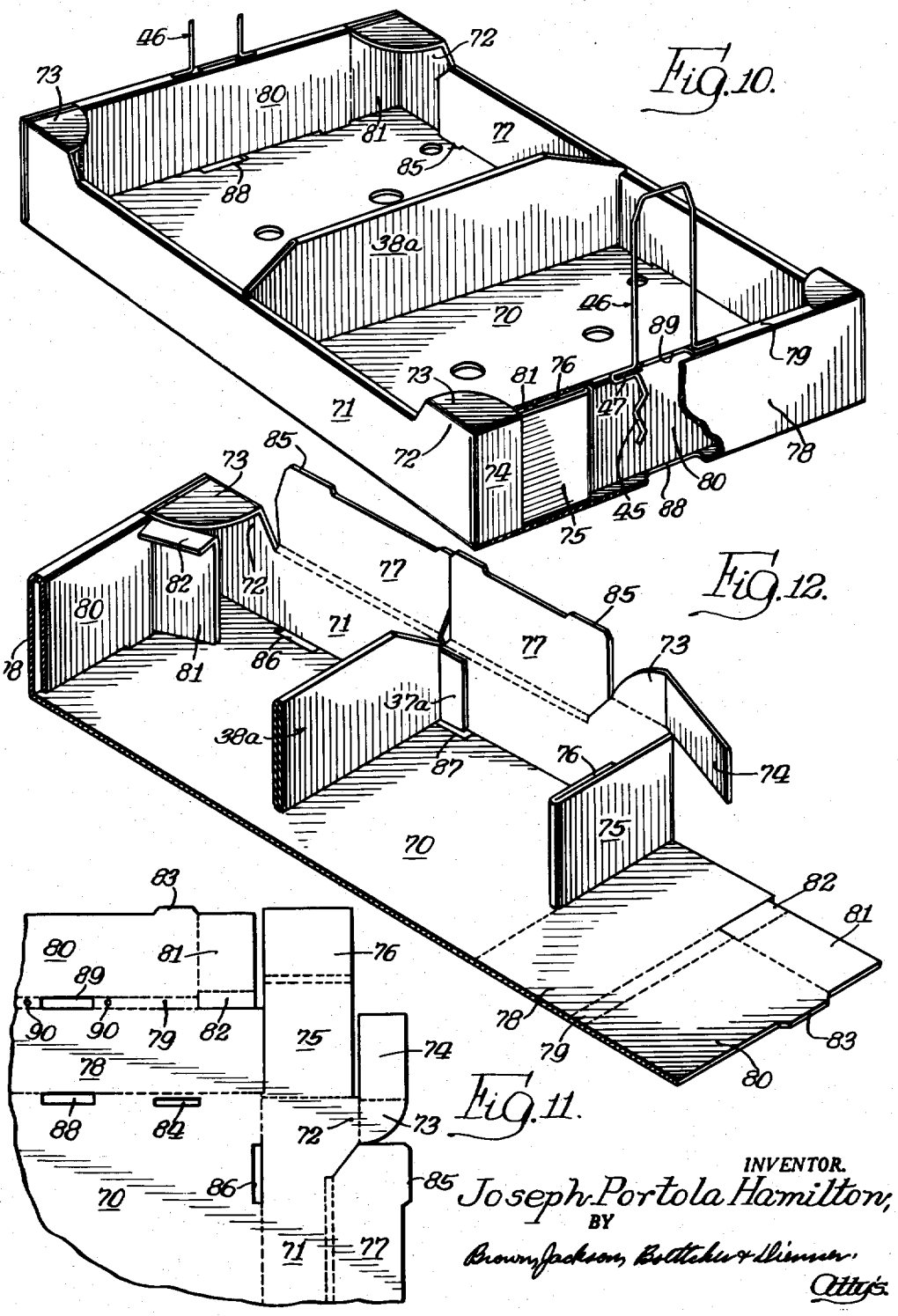

STACKING PAPERBOARD TRAY
Original Filed Aug. 7, 1956 5 Sheets-Sheet 5
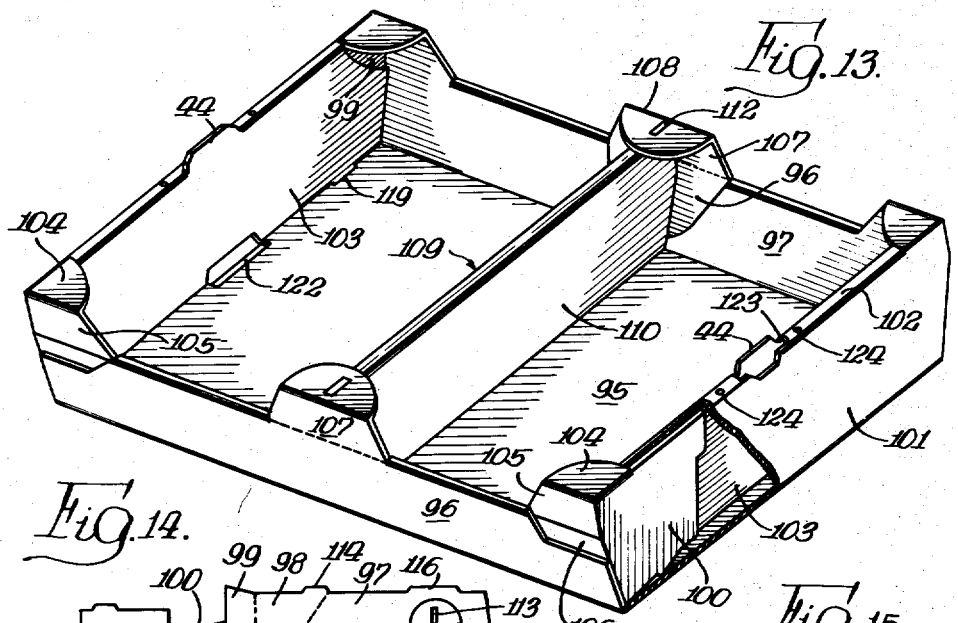
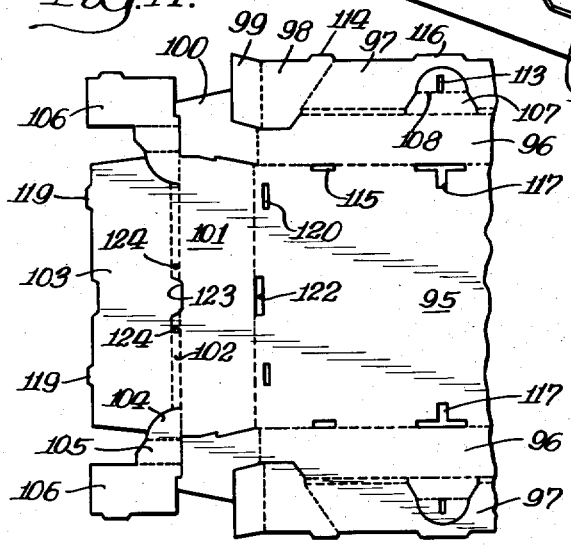
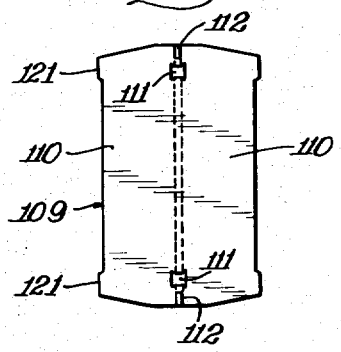
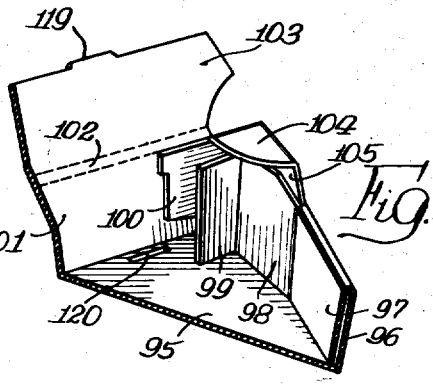
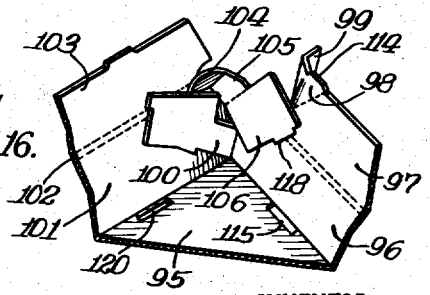
Fig. 17.
INVENTOR.
Joseph Portola Hamilton,
BY
Brown, Jackson, Boettcher & Dienner,
Attys.

United States Patent Office

Re. 25,050
Reissued Oct. 10, 1961

25,050

STACKING PAPERBOARD TRAY

Joseph Portola Hamilton, Alameda County, Calif., assignor to Container Corporation of America, Chicago, Ill., a corporation of Delaware Original No. 2,868,430, dated Jan. 13, 1959, Ser. No. 602,600, Aug. 7, 1956. Application for reissue Dec. 23, 1960, Ser. No. 78,198
9 Claims. (Cl. 229—34)

Matter enclosed in heavy brackets [ ] appears in the original patent but forms no part of this reissue specification; matter printed in italics indicates the additions made by reissue.

This invention relates to open top trays formed of a suitable sheet material, such as paper board, suitable for arranging in stacks of considerable height.

Open top trays of the general type with which my invention is concerned, frequently termed lugs, are used in large volume in harvesting and storing berries, fruits, vegetables and other agricultural products. The loaded trays usually are stacked to considerable height in the field, during harvesting, and in storage, to conserve space. It is important that the trays provide for free ventilation of the contents of the stacked and loaded trays, be of adequate mechanical strength to withstand the considerable loads to which they may be subjected in use, and that they be of a character to be readily stacked to considerable height without risk of upsetting of the stack or of individual loaded trays. A further and important consideration in this highly competitive field is the cost of production which, for practical considerations, must be kept low enough to justify use of the trays in large volume. My invention is directed to a tray which meets the above requirements and which may readily be produced in large volume and at comparatively low cost. Further objects and advantages of my invention will appear from the detail description.

In the drawings:

FIGURE 1 is a perspective view, partly broken away, of a tray embodying my invention;

FIGURE 2 is a fragmentary sectional view, on an enlarged scale, taken substantially on line 2—2 of FIGURE 1;

FIGURE 3 is a fragmentary sectional view, on an enlarged scale, taken substantially on line 3—3 of FIGURE 1;

FIGURE 10 is a perspective view, partly broken away, of a second modified form of tray embodying my invention;

FIGURE 11 is a plan view, on a reduced scale, of one corner portion of the blank from which the tray of FIGURE 10 is formed;

FIGURE 12 is a view similar to FIGURE 9 but of the second modified form of tray of FIGURE 10;

FIGURE 13 is a perspective view of a third modified form of tray embodying my invention;

FIGURE 14 is a plan view, on a reduced scale, of the blank from which the tray of FIGURE 13 is produced, showing approximately one half of the complete blank;

FIGURE 15 is a plan view of the blank from which the partition of the tray of FIGURE 13 is formed;

FIGURE 16 is an inner perspective view of one corner portion of the blank of FIGURE 14 in partially folded condition; and FIGURE 17 is a view similar to FIGURE 16 but showing the blank in a more advanced folded condition.

Figure 4:
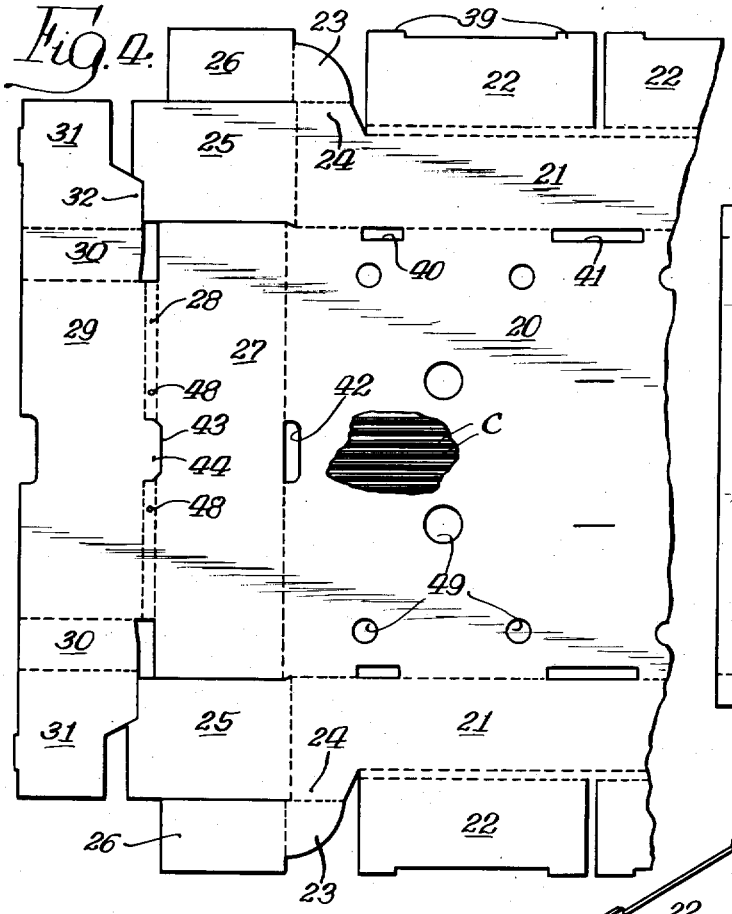
FIGURE 4 is a plan view, on an enlarged scale, partly broken away, of the blank from which the tray of FIGURE 1 is formed, showing somewhat more than one half of the complete blank.

The tray shown in FIGURE 1 is an open top tray rectangular in plan and comprises a bottom wall panel 20 and side and end walls extending upward from panel 20 joined together at their top corners by substantially triangular seats to be referred to more fully presently. The tray of FIGURE 1 is formed from the blank of FIGURE 4, which is a one piece blank cut from suitable sheet material, preferably double faced corrugated paper board, the blank being so cut that the flutes or corrugations c of the corrugated paper board extend lengthwise of the blank, as shown in FIGURE 4. The blank is suitably cut and scored to provide the bottom wall panel 20, outer side wall panels 21 hinged to the side edges of panel 20 along fold lines, inner side wall panels 22, each formed in two sections with their inner ends spaced an appreciable distance apart and hingedly attached along fold lines to the upper edge of the outer side wall panel 20, substantially triangular seats 23 attached along fold lines to upward extensions 24 of the outer side wall panels at the ends thereof, flaps 25 attached to the ends of the outer side wall panels 21 along fold lines, and flaps 26 attached along fold lines to the end edges of the seats 23. The blank further includes outer end wall panels 27 attached along a fold line to each end of panel 20, a relatively narrow fold strip 28 attached at its outer edge along a fold line to the upper edge of panel 27, an inner end wall panel 29 attached at its upper edge along a fold line to the inner edge of the fold strip 28, relatively narrow inner flaps 30 attached at their end edges to the ends of panel 29 along fold lines, and relatively wide outer flaps 31 attached to flaps 30 along fold lines, each of the outer flaps 31 having at its outer end portion an upward extension 32 similar to the extensions 24 of the outer side wall panels 21. In the above the elements of the blank have been described with reference to the positions which they occupy when the blank has been folded into tray form. It will be understood that the elements of the blank and the fold lines thereof are appropriately formed and disposed to permit folding of the blank to produce the tray in the manner to be described.

Figure 5:
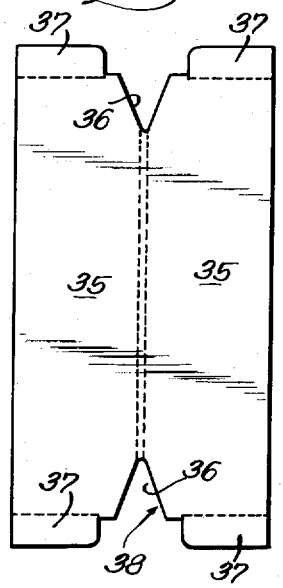
FIGURE 5 is a plan view, on an enlarged scale, of the blank from which the partition is formed.

Preferably, though not necessarily, the tray is provided with a central transverse divider or partition. The partition is formed from the substantially rectangular blank shown in FIGURE 5 which preferably is cut from double faced corrugated paper board with the flutes or corrugations extending transversely of the blank. The blank is centrally scored to provide two arms 35 and is further cut and scored to provide V-shaped notches 36 extending from the ends of the blank centrally thereof and rectangular securing tabs 37 attached to the ends of arms 35 along fold lines. Folding the blank centrally so as to bring the arms 35 thereof together, and folding the tabs 37 outward at right angles to the arms 35 produces the partition 38. The partition thus produced is of proper length to fit between the outer side wall panels 21 with the tabs 37 seating flatwise on the inner faces of those panels, as will appear more fully presently.

Figure 6:
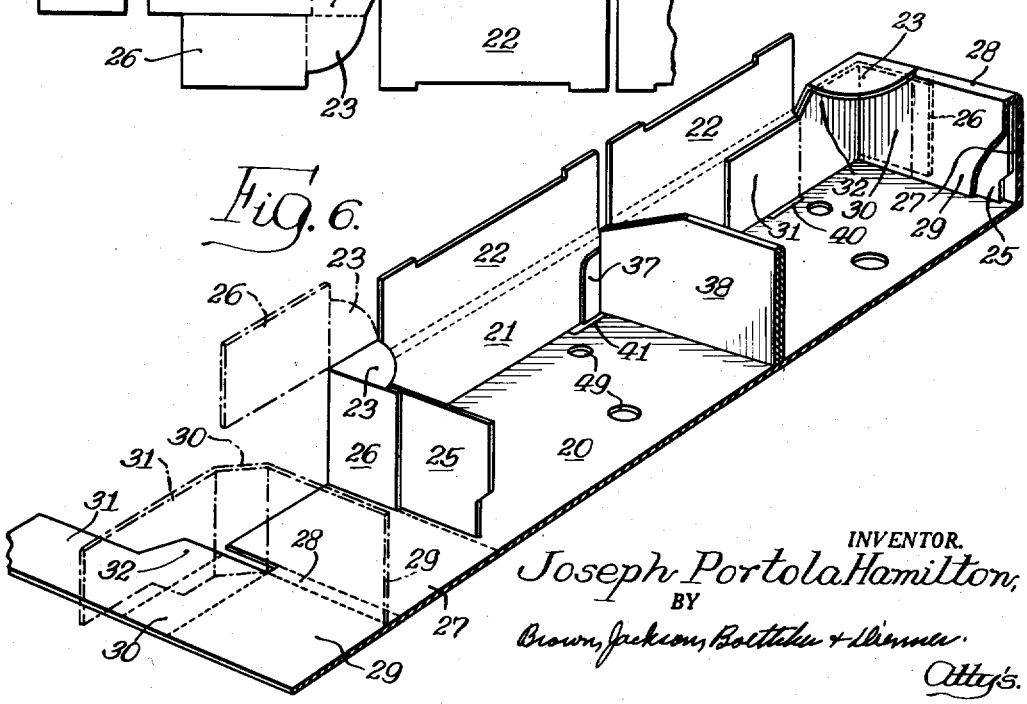
FIGURE 6 is an inner perspective view of the tray of FIGURE 1, in partially set up condition to illustrate the manner of folding of the blank, showing somewhat less than one half of the width of the tray.

In order to set up the blank of FIGURE 4 to produce the tray of FIGURE 1, referring more particularly to FIGURE 6, the outer side wall panels 21 are swung up to vertical positions, with the flaps 25 folded inward at right angles to panels 21 and the corner seats 23 folded downward to horizontal position with the seat flaps 26 extending downward along the outer faces of the flaps 25, the flaps 30 are folded outward at right angles to the inner end wall panels 29, the outer end wall panels 27 are swung upward to vertical position and the inner wall panels 29 are then swung inward and downward to vertical position, after which the panels 30 are moved outward to positions seating on the inner faces of flaps 25 with the flaps 31 seating on the inner faces of the outer side panels 21, it being noted that the width of flaps 30 correspond to the width of the side edges of the seats 23 and the extensions 32 of the flaps 31 correspond to the extensions 24 of the outer side wall panels 21. It will also be noted that the height of the flaps 30 and of the flaps 31 at the areas of the extensions 32 thereof corresponds to the distance of the seats 23 above the bottom wall panel 20. It will also be noted that the height of the reduced portions of the flaps 31 correspond in height to the outer side wall panels 21. Further, the height of the flaps 26 of the seats 23 is the same as the height of the flaps 25 so that flaps 26 seat at their lower ends on the bottom wall panel 20 at the outer faces of the flaps 25. When the blank has been set up to the extent stated, the side and the end walls thereof are joined together by the triangular corner seats 23 supported at their end edge portions by three thicknesses of material provided by the seat flaps 26 in conjunction with the flaps 32 and the flaps 30 which fit tightly between the seats 23 and the bottom wall panel 20. Each of the seats 23 is also supported at its side edge portion by two thicknesses of material provided by the outer side wall panel 21 and extension 24 thereof and by the flap 31 and extension 32 thereof fitting tightly between the seat and the bottom wall panel 20. I thus provide corner supporting structures of exceptional strength for the seats which enables them to support heavy loads without risk of collapse and injury to the contents of the tray when the loaded trays are placed in stacks of considerable height. After the blank has been folded to complete the end structures of the tray, as above indicated, the partition 38 is placed upon the bottom wall panel 20 at the midlength thereof, with the securing tabs 34 seating on the inner faces of the outer side wall panels 21, as shown in FIGURE 6. The sections 22 of the inner side wall panels are then folded downward against the inner faces of the flaps 31 and the tabs 37 and are locked in position by locking tabs 39 at the lower edges of the sections of panel 22, tabs 39 snapping into slots 40 and 41 in bottom wall panel 20 at the sides thereof as the sections of the inner side wall panel 22 are moved outwardly to positions seating on the inner faces of flaps 31 and tabs 37. The end portions of the partition 38 fit snugly between the ends of the sections of the inner side wall panels 22 which effectively restrain the partition 38 against displacement lengthwise of the tray. The completed tray, with the partition 38 therein, appears as in FIGURE 1.

As will be understood from what has been said and as shown in FIGURES 1 and 2, the flaps 25 and 26 space the end wall panels 27 and 29 apart a distance approximately equal to the width of the fold strip 28, and the flaps 25 are spaced a considerable distance apart at their inner ends in the completed tray. The bottom wall panel 20 is provided at the center of each end thereof with a slot 42 of appreciable length aligned with a slot 43 provided in fold strip 28 by cutting therefrom a tab 44 forming an upward extension of the inner wall panel 27. The space between the end wall panels 27 and 29 receives downward extensions 45 of a wire handle 46 of approximately elongated inverted U-shape. The extensions 45 are connected to the arms of handle 46 by inwardly opening narrow loops 47 the outer ends of which pass through openings 48 in the fold strip 28. The loops 46 have an interior width such that they grip the corresponding areas of strip 28 and extensions 45 are offset and bent so that they are maintained in pressure contact with the inner faces of the end wall panels 27 and 29. The handle 46 is thus maintained in position extending upward from the fold strip 28 with the upper arms of the loops 47 seating on the upper face of strip 48, effective for restraining handle 46 against downward movement, the lower arms of the loops 47 restraining the handle against upward movement. The height of the handle 46 above fold strip 28 is approximately one and one-half times the height of the end wall of the tray. In stacking the loaded trays, starting with the first or bottom tray of the stack the next tray is positioned so that the handles of the first tray enter through bottom slots 42 of the second tray and pass upward between the end wall panels of that tray and through slot 43 in the fold strip 28, so as to project above the second tray a distance equal to approximately one-half the height of the end wall of a tray. After the second tray has been placed upon the bottom tray of the stack to be formed, a third tray is placed on the second tray and the operation is repeated until the stack has been built up to the desired height. The stack thus formed may include a considerable number of loaded trays, the handles serving to guide and center the trays during stacking thereof and also serving to restrain the trays against relative movement in the stack. The slots 42 of the bottom wall panel 20 also receive the tabs 44, to avoid any interference in stacking of the trays, and the partition 38 is of a height approximately the same as, preferably slightly less than, that of the end walls of the tray so that each tray of the stack above the bottom tray thereof seats upon the seats 23 of the subjacent tray. As above described, and as will be clear from FIGURE 1, the side walls of the tray are of appreciably less height than the end walls thereof thereby providing openings of appreciable height between the stacked trays assuring adequate ventilation of the contents thereof. With a view to increased ventilation the bottom wall panel 20 of the tray may be provided with suitably disposed openings 49 in certain cases, as where the berries or other small fruits or vegetables are placed in suitable open work containers or boxes set in the tray.

Figure 7:
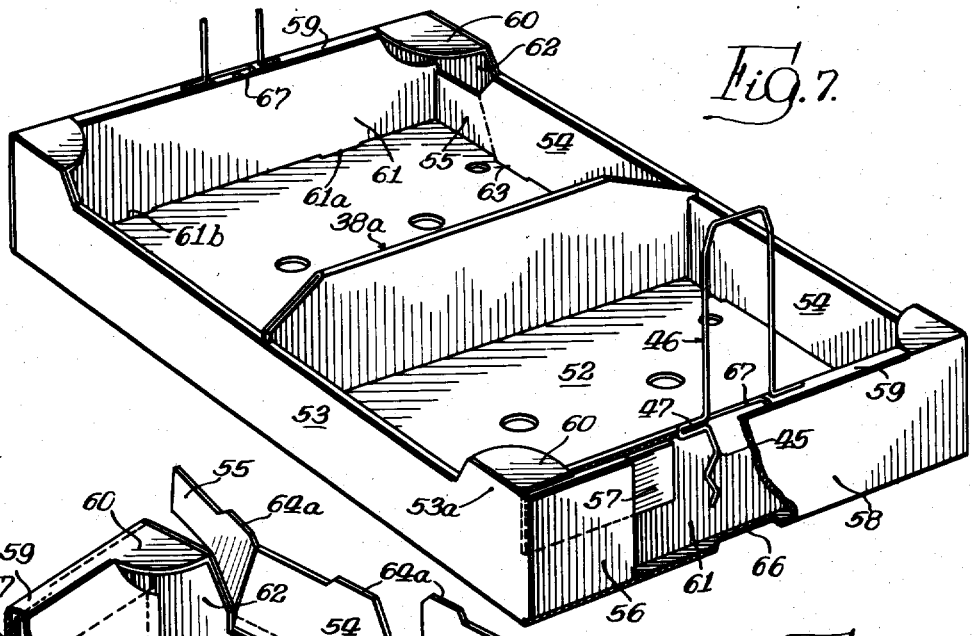
FIGURE 7 is a perspective view, partly broken away, of a modified form of tray embodying my invention.
Figure 8:
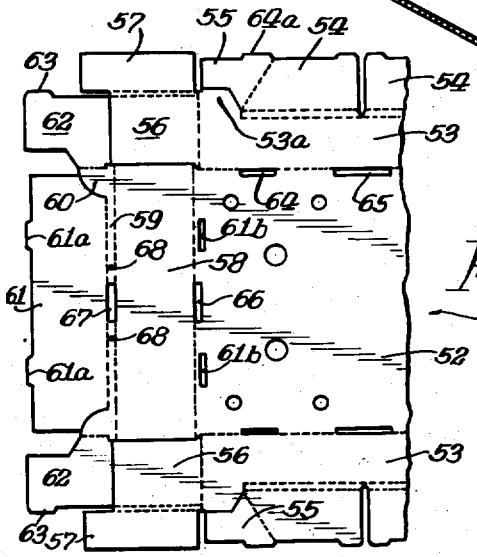
FIGURE 8 is a plan view, on a reduced scale, of the blank from which the tray of FIGURE 7 is formed, showing somewhat more than one half of the complete blank.

The modified form of tray shown in FIGURE 7 is quite similar to that of FIGURE 1 and is formed from the blank shown in FIGURE 8. That blank preferably is of the same material as the blank for the tray of FIGURE 1 and is suitably cut and scored to provide a bottom wall panel 52, outer side wall panels 53 attached along fold lines to the side edges of panel 52, inner side wall panels 54, each formed in two lengthwise sections, attached along fold lines to the upper edges of the panels 53, flaps 55 attached to the outer ends of the sections of the inner wall panels 54 along inclined fold lines, inner flaps 56 attached to the ends of the outer side wall panels 53 along fold lines and upper flaps 57 attached to the upper edges of the flaps 56 along fold lines. The blank further includes outer end wall panels 58 attached to the ends of bottom wall panel 52 along fold lines, a relatively narrow fold strip 59 attached to the upper edge of panel 58 along a fold line and provided at each end with an integral substantially triangular seat 60, an inner end wall panel 61, from which the seats 60 are cut, attached at its upper edge along a fold line to the inner edge of the fold strip 59, and a flap 62 attached along a fold line to the side edge of seat 60.

Figure 9:
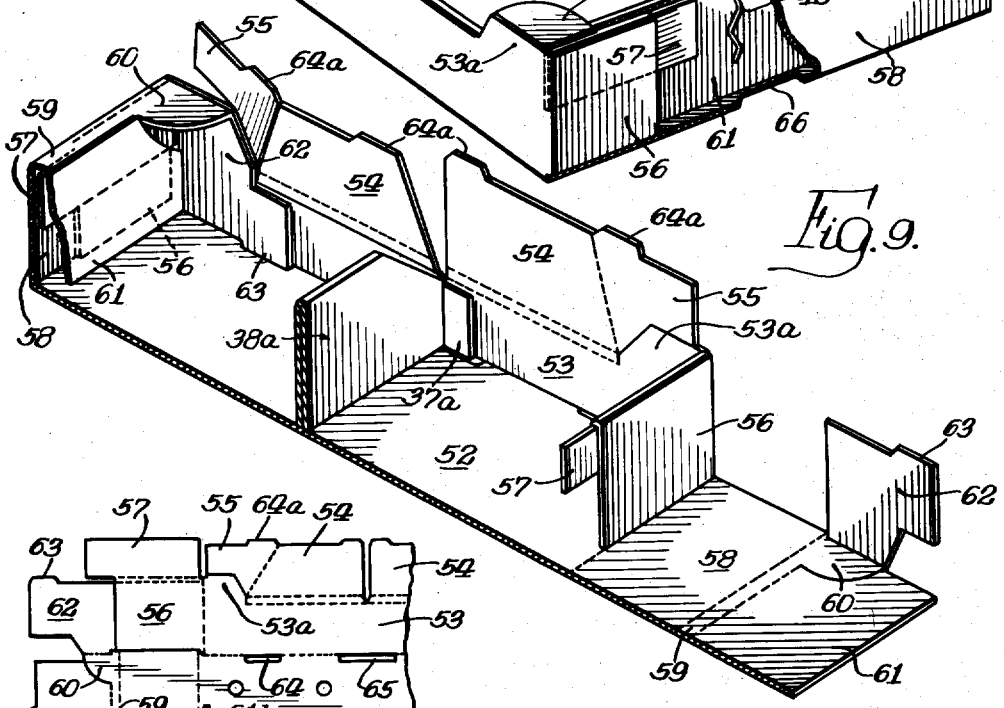
FIGURE 9 is a view similar to FIGURE 6 but of the modified form of tray of FIGURE 7.

In folding the blank of FIGURE 8 to produce the tray of FIGURE 7, referring to FIGURE 9, the outer side wall panels 53 are swung up to vertical position, the flaps 57 are folded downward against the inner faces of flaps 56, which are folded inward at right angles to panels 53, the outer end wall panels 58 are swung upward to vertical position, with the flaps 62 attached to the side edges of seats 60 along fold lines folded inward at right angles to seats 60, fold strips 59 are then folded downward and inward to horizontal position, and the inner end wall panels 61 are folded downward to vertical position over the flaps 56 and 57 with locking tabs 61a, at the lower edge of panel 61, engaging into slots 61b in bottom wall panel 52. The seats 60 are then supported at their end edges by the outer end wall panel 58 and at their side edges by the end portions, including the upward extensions 53a thereof, of the outer side wall panels 53 and by the flaps 62, the outer end portions of which conform to the corresponding portions of the outer side wall panels 53 and which fit tightly between the bottom wall panel 52 and the seats 60. The inner end wall panels 61 fit tightly between the flaps 62 restraining them against bending or buckling inward and holding them seated on the inner faces of the corresponding portions of the outer side wall panels 53. Each of the flaps 62 is provided at its lower edge and adjacent its inner end with a downwardly extending locking tab 63 which engages into a corresponding slot 64 in the edge of bottom wall panel 52. After the end walls of the tray have been assembled in the manner described, the partition 38a, similar to the partition 38 of FIGURE 1 and provided at its ends with securing tabs 37a, is positioned at the midlength of the bottom wall panel 52 with the tabs 37a seating on the inner faces of the outer side wall panels 53. The flaps 55 are then swung outward to clear the seats 60, the inner side wall panels 54 are swung downward and inward into vertical position and the flaps 55 are swung outward into alignment with the corresponding sections of the inner side wall panel, after which the sections 54 and flaps 55 of that panel are pressed outwardly so as to seat on the flaps 62 and the tabs 37a. As the sections of the panel 54 reach that position, together with the flaps 55, locking tabs 64a at the lower edges of flaps 55 and panel sections 54 snap into slots 64 and 65 in the edge of the bottom wall panel 52, locking the inner side wall panels in position. That completes the tray of FIGURE 7, in which the end wall panels 58 and 61 are spaced apart by the flaps 56 and 57 for reception between them of a wire handle similar to the handle 46 of FIGURE 1. In that connection it will be noted that the inner ends of flaps 56 are spaced a considerable distance apart, as are the inner ends of flaps 57, the bottom wall panel 52 is provided at the center of each end with a slot 66 aligned with a slot 67 in fold strip 59, and the fold strip is provided with two openings 68 spaced from the ends of slot 67 for reception of the loops of the handle.

The second modified form of tray shown in FIGURE 10 is similar to that of FIGURE 1. It is formed from the blank of FIGURE 11 which is suitaby cut and scored to provide a bottom wall panel 70, outer side wall panels 71 attached to the side edges of panels 70 along fold lines and provided at each end with an upward extension 72, a substantially triangular seat 73 attached to the upper edge of extension 72 along a fold line, a flap 74 attached along a fold line to the end edge of seat 73, an inner flap 75 attached to each end of panel 71 along a fold line, an outer flap 76 attached along a fold line to flap 75, and an inner side wall panel 77 formed in two lengthwise sections attached along a fold line to the upper edge of the outer side wall panel 71. The blank further includes outer end wall panels 78 attached along fold lines to the ends of the bottom wall panel 70, a narrow fold strip 79 attached along a fold line to the upper edge of each of the outer end wall panels 78, an inner end wall panel 80 attached along a fold line to the inner edge of each of the fold strips 79, a flap 81 attached along a fold line to each end of the inner end wall panel 80, and a relatively narrow flap 82 attached along a fold line to the upper edge of the flap 81.

To produce the tray of FIGURE 10 from the blank of FIGURE 11, referring to FIGURE 12, the outer side wall panels 71 are swung up to vertical position with the flaps 75 folded inward at right angles to panels 71 and the flaps 76 folded onto the inner faces of the flaps 75, the seats 73 are folded downward and inward to horizontal position with the seat flaps 74 extending downward along the inner faces of flaps 75, the flaps 81 and 82 are folded together inward at right angles to the inner end wall panels 80, the fold strips 79 are folded downward to horizontal position and the inner end wall panels 80 are folded downward and inward to vertical position seating on the inner faces of the flaps 76 with locking tabs 83 engaging in slots 84 in bottom wall panel 70, after which the flaps 81 are folded to positions seating on the inner faces of the seat flaps 74, flaps 82 being folded over at right angles to flaps 81 and seating against the under faces of the seats 73. The seat flaps 74 are of proper width to fit tightly between the flaps 76 and the outer side wall panels 71 and provide, in conjunction with flaps 75 and 81 two thicknesses of material supporting the end edge portions of the seats 73, the side edge portions of which are supported by the outer side wall panel 71 and extension 72 thereof. After the blank has been folded to the extent indicated, the partition 38a is positioned upon the bottom wall panel 70, with tabs 37a seating on the inner faces of outer side wall panel 71 and the sections of the inner side wall panel 77 are swung downward and inward to vertical position seating on the tabs 37a and the inner face of panel 71, in which position they are secured by engagement of locking tabs 85 at the lower ends of the panel sections 77, which locking tabs snap into slots 86 and 87 in the edge of the bottom wall panel 70. The last mentioned panel is provided at the midwidth of each end thereof with a slot 88 aligned with a slot 89 in the narrow fold strip 79, the latter being provided with two openings 90 adjacent the ends of slot 89. The flaps 75 and 76 space apart the end wall panels 78 and 80 for reception of a wire handle mounted at each end of the tray in the manner previously described.

The third modified form of tray embodying my invention, shown in Figure 13, is produced from the blank of Figure 14. The blank comprises a bottom wall panel 95, outer side wall panels 96 attached to the side edges of panel 95 along fold lines, inner side wall panels 97 attached along fold lines to the upper edges of the outer side wall panels 96, inner flaps 98 cut in part from the outer side wall panels 96 and attached along fold lines to the ends of the inner side wall panels 97, outer flaps 99 also cut in part from the outer side wall panels 96 and attached along fold lines to the flaps 98, the flaps 99 being also cut in part from flaps 100 attached along fold lines to the outer side wall panels 96. The blank further includes outer end wall panels 101 attached along a fold line to the bottom wall panel 95 at each end thereof, it being noted that the ends of the panels 101 are inclined upward and outward, a narrow fold strip 102 attached along a fold line to the upper edge of each of the panels 101, an inner end wall panel 103 attached at its upper edge to the inner edge of fold strip 102 along a fold line, the ends of panel 103 also being inclined upward and outward in the tray, substantially triangular seats 104 at the ends of panels 101 and attached to the upper edges thereof along fold lines, flaps 105 attached along fold lines to the side edges of the seats 104 and flaps 106 attached at their upper edges along fold lines to the flaps 105. Each of the inner side wall panels 97 is also provided, at its midlength, with a flap 107 cut from the midportion thereof and attached at its outer edge along a fold line to the upper edge of the corresponding outer side wall panel 96, flap 107 being provided at about its midlength with a transverse fold line 108. The tray of Figure 13 is provided with a central transverse partition 109 formed from the blank of Figure 15 which, like the blank for the body of the tray, is cut from double face corrugated paper board. The blank of Figure 15 is folded along a central lengthwise fold line to provide two arms 110 the ends of which are slightly beveled or inclined, as shown in Figure 15. Further, the partition blank is cut away adjacent each end thereof, at 111, and the top end portions of the blank and are suitably formed to provide upwardly extending securing tabs 112 of appropriate size to fit tightly through slots 113 in flaps 107.

In folding the blank of Figure 14 to provide the tray of Figure 13, referring to Figures 16 and 17, the outer side wall panels 96 are swung upward to vertical position with the flaps 100 folded inward at right angles thereto, the outer end wall panels 101 are swung upward into vertical position with flaps 100 seating on the inner faces of panels 101, the seats 104 are folded downward to horizontal position with the flaps 105 and 106 disposed substantially vertically and at a downward and inward inclination and seating on the inner face of panel 96, respectively, and the inner side wall panels 97 are then folded downward and inward into positions seating on the inner end portions of the flaps 106, with the flaps 98 and 99 seating on the inner faces of flaps 105 and 106 and flap 100, respectively. As the inner side wall panel 97 reaches its fully folded position, locking tabs 114 at the lower edges of flaps 98 snap into slots 115 in the bottom wall panel 95, and a locking tab 116 at the midlength of the lower edge of panel 97 snaps into the head portion of a T-slot 117 in the bottom wall panel 95. When the flap 106 is in its fully operative position seating on the inner face of panel 96, a locking tab 118 at the lower edge thereof engages in the slot 115 at the inner side of locking tab 114 of flap 98. Folding of the blank to the extent above indicated completes the side walls of the tray in which the flaps 98 provide, in conjunction with flaps 105 and 106 two thicknesses of material supporting the side edge portion of the seat 104 and the flaps 99 provide, in conjunction with the outer end wall panels 101 two thicknesses of material supporting the end edge portion of the seats 104. The inner end wall panels 103 are then folded downward and inward to positions seating on the inner faces of the flaps 99, with locking tabs 119 at the lower edge of panel 103 engaged in slots 120 at the end edge of panel 103. As previously noted, the ends of the outer end wall panels 101 are inclined upward and outward, as are the ends of the inner end wall panels 103, so that the side walls of the tray are also inclined upward and outward, panel 103 fitting tightly between flaps 98 effective for restraining them against inward movement. That completes the tray except for the partition 109 which is placed upon the bottom wall panel 95 and is anchored in position by folding over the flaps 107 so that the upper portions thereof seat on partition 109 and engage over the tabs 112 of partition 109. Referring further to Figure 15, it will be noted that each arm 110 of partition 109 is provided at each end of the lower edge thereof with a locking tab 121. When the folded partition 109 is placed in position on the bottom wall panel 95 the locking tabs 121 thereof are inserted through the stems of the slots 117 thereby locking the lower edges of arms 110 against movement away from each other, after which the flaps 107 are folded over into position engaging about the tabs 112. The ends of the arms 110 of partition 109 are inclined, as shown in Figure 15, and abut the inner faces of the side walls of the assembled tray. The bottom wall panel 95 is provided at the central area of each end thereof with a slot 122 aligned with a slot in the fold strip 102, which is provided with openings 124 adjacent the ends of slot 123; as and for the purposes above described. In that connection, it will be noted that the end wall panels 101 and 103 are spaced apart by the flaps 99 and 100 and that the two latter flaps terminate a substantial distance from the midlength of the end wall.

As will be understood from the above, in each form of tray shown, by way of example, the fold strips at the tops of the end walls provide seating surfaces of substantial width supplementary to, and as extensions of, the corner seats and which facilitate stacking of the trays. The seats and the end portions of the fold strips are supported to considerable extent by the flaps extending between the end wall panels and between the bottom wall panel and the seats and the fold strips.

As above indicated, changes in detail may be resorted to without departing from the field and scope of my invention, and I intend to include all such variations, as fall within the scope of the appended claims, in this application in which the preferred forms only of my invention have been disclosed.

I claim:

1. In a load supporting corner construction for a substantially rectangular open top stacking tray formed from a one piece blank of sheet material such as paper board and having two opposite walls of less height for the major portion of their length than the other two opposite walls, a bottom wall panel, a first wall and a second wall extending upward from said bottom wall panel and disposed substantially perpendicular to each other, said walls respectively comprising an outer panel and an inner panel secured together at their upper edges by a fold strip, a substantially horizontal corner seat attached at one outer edge to the upper edge of the outer panel of said first wall, a first flap attached to the other outer edge of said seat extending therefrom toward said bottom wall panel, a second flap attached to the end of the outer panel of the first wall extending between the panels of said second wall, and a third flap attached to the end of the inner panel of said second wall underlying said seat adjacent said other outer edge thereof and extending therefrom to said bottom wall panel, said second and third flaps providing two thicknesses of load supporting material at said other outer edge of said seat and said outer panel of said first wall providing one thickness of material supporting said seat at said one outer edge thereof.

2. In a load supporting corner construction for a substantially rectangular open top stacking tray formed from a one piece blank of sheet material such as paper board and having two opposite walls of less height for the major portion of their length than the other two opposite walls, a bottom wall panel, a first wall and a second wall extending upward from said bottom wall panel and disposed substantially perpendicular to each other, said walls respectively comprising an outer panel and an inner panel secured together at their upper edges by a fold strip, a substantially horizontal corner seat attached at one outer edge to the upper edge of the outer panel of said first wall, a first flap attached to the other outer edge of said seat extending therefrom to said bottom wall panel, a second flap attached to the end of the outer panel of said first wall extending from said seat to said bottom wall panel at the inner face of said first flap, and a flap attached to the end of the inner panel of said second wall extending from said seat to said bottom wall panel at the inner face of the outer panel of said first wall, said first and second flaps providing two thicknesses of material supporting said other outer edge of said seat and said flap attached to the end of the inner panel of said second wall providing with the adjacent portion of the outer panel of said first wall two thicknesses of material supporting said one outer edge of said seat, said last mentioned flap having an extension confined between said panels of said one wall.

3. In a load supporting corner construction for a substantially rectangular open top stacking tray formed from a one piece blank of sheet material such as paper board and having two opposite walls of less height for the major portion of their length than the other two opposite walls, a bottom wall panel, a first wall and a second wall extending upward from said bottom wall panel and disposed substantially perpendicular to each other, said walls respectively comprising an outer panel and an inner panel secured together at their upper edges by a fold strip, a substantially horizontal corner seat attached at one outer edge to the upper edge of the outer panel of said first wall, a first flap attached to the other outer edge of said seat extending therefrom to said bottom wall panel, a second flap attached to the end of the outer panel of said first wall extending from said seat to said bottom wall panel at the inner face of said first flap, and a flap attached to the end of the inner panel of said second wall extending from said seat to said bottom wall panel at the inner face of the outer panel of said first wall, said first and second flaps providing two thicknesses of material supporting said other outer edge of said seat and said flap attached to the end of the inner panel of said second wall providing with the adjacent portion of the outer panel of said first wall two thicknesses of material supporting said one outer edge of said seat.

4. In a load supporting corner construction for a substantially rectangular open top stacking tray formed from a one piece blank of sheet material such as paper board and having two opposite walls of less height for the major portion of their length than the other two opposite walls, a bottom wall panel, a first wall and a second wall extending upward from said bottom wall panel and disposed substantially perpendicular to each other, said walls respectively comprising an outer panel and an inner panel secured together at their upper edges by a fold strip, a substantially horizontal corner seat attached at one outer edge to the upper edge of the outer panel of said first wall, a first flap attached to the other outer edge of said seat extending therefrom to said bottom wall panel, a second flap attached to the end of the outer panel of said first wall extending across one face of said first flap, a third flap attached to the end of the inner panel of said second wall underlying said seat adjacent said other outer edge thereof and extending therefrom to said bottom wall panel, and a fourth flap attached to said third flap underlying said seat adjacent said one outer edge thereof and extending therefrom to said bottom wall panel at the inner face of the outer panel of said first wall, said first and third flaps providing two thicknesses of material supporting said seat at said other outer edge thereof and said fourth flap providing with the adjacent portion of the outer panel of said first wall two thicknesses of material supporting said one outer edge of said seat.

5. In a load supporting corner construction for a substantially rectangular open top stacking tray formed from a one piece blank of sheet material such as paperboard and having two opposite walls of less height for the major portion of their length than the other two opposite walls, a bottom wall panel, a first wall and a second wall extending upward from said bottom wall panel and disposed substantially perpendicular to each other, said walls respectively comprising an outer panel and an inner panel secured together at their upper edges by a fold strip, a substantially horizontal corner seat attached at one outer edge to the upper edge of the outer panel of said first wall, a first flap attached to the other outer edge of said seat extending therefrom toward said bottom wall panel at the inner face of the outer panel of said second wall, a second flap attached to the end of the outer panel of said first wall extending from said seat to said bottom wall panel parallel to said first flap, a third flap attached to the end of the inner panel of said second wall extending from said seat to said bottom wall panel parallel to said second flap, and a fourth flap attached to said third flap extending from said seat to said bottom wall panel parallel to the outer panel of said first wall, said second and third flaps providing two thicknesses of load supporting material at said other outer edge of said seat and said fourth flap providing with the adjacent portion of said outer panel of said first wall two thicknesses of load supporting material at said one outer edge of said seat.

6. In a load supporting corner construction for a substantially rectangular open top stacking tray formed from a one piece blank of sheet material such as paperboard and having two opposite walls of less height for the major portion of their length than the other two opposite walls, a bottom wall panel, a first wall and a second wall extending upward from said bottom wall panel and disposed substantially perpendicular to each other, said walls respectively comprising an outer panel and an inner panel secured together at their upper edges by a fold strip, a substantially horizontal corner seat attached at one outer edge to the upper edge of the outer panel of said first wall, a first flap attached to the other outer edge of said seat extending therefrom to said bottom wall panel at the inner face of the outer panel of said second wall, a second flap attached to the end of the outer panel of said second wall extending from said seat toward said bottom wall panel at the inner face of the outer panel of said first wall, a third flap attached to the end of the inner panel of said second wall extending from said seat to said bottom wall panel at the inner face of said first flap, and a fourth flap attached to said third flap extending from said seat to said bottom wall panel at the inner face of said second flap, said first and third flaps providing two thicknesses of material supporting said seat at said other outer edge thereof and said fourth flap providing in conjunction with the outer panel of said first wall at least two thicknesses of material supporting said seat at said one edge thereof.

7. In a load supporting corner construction for a substantially rectangular open top stacking tray formed from a one piece blank of sheet material such as paperboard and having a bottom wall panel and two opposite end walls and two opposite side walls extending upward from said bottom wall panel, said walls respectively comprising an outer panel and an inner panel joined together at their upper edges by a fold strip and said inner panel extending to and having interlocking engagement with said bottom wall panel effective for restraining said inner panel against movement away from its associated outer panel, said side walls being of less height for the major portion of their length than said end walls whereby said end walls bear the load of the superposed trays of a stack of trays, two of said walls comprising an end wall and a side wall disposed substantially perpendicular to each other defining a corner between them, a corner seat attached at one outer edge to one of the panels of one of said two walls and extending from the upper edge thereof perpendicular thereto in a substantially horizontal plane above the fold strip of said side wall, said one panel of said one wall extending from said seat to said bottom wall panel providing a load supporting element at said one outer edge of said seat, a first flap attached to the other outer edge of said seat extending perpendicular thereto downward to said bottom wall panel and confined between the panels of the other of said two walls providing a load supporting element at said other edge of said seat, one of the panels of one of said two walls having a flap attached to the end thereof extending about the corner and confined between the panels of the other of said two walls, said last mentioned flap extending from an outer edge of said seat to said bottom wall panel effective in cooperation with said first flap and its confining wall panels for tieing said walls together at said corner and thereby restraining them against relative outward movement while also providing a load supporting element at the corresponding outer edge of said seat, the inner panel of the other of said two walls having a flap extending beneath the corner seat and contacting the latter and the bottom wall panel providing an additional load supporting element, the inner and outer panels of said end wall providing between said seats two load supporting elements extending to said bottom wall panel.

8. In a load supporting corner construction for a substantially rectangular open top stacking tray formed from a one piece blank of sheet material such as paperboard and having a bottom wall panel and two opposite end walls and two opposite side walls extending upward from said bottom wall panel, said walls respectively comprising an outer panel and an inner panel joined together at their upper edges by a fold strip and said inner panel extending to and having interlocking engagement with said bottom wall panel effective for restraining said inner panel against movement away from its associated outer panel, said side walls being of less height for the major portion of their length than said end walls whereby said end walls bear the load of the superposed trays of a stack of trays, two of said walls comprising an end wall and a side wall disposed substantially perpendicular to each other defining a corner between them, a corner seat attached at one outer edge to one of the panels of one of said two walls and extending from the upper edge thereof perpendicular thereto in a substantially horizontal plane above the fold strip of said side wall, said one panel of said one wall extending from said seat to said bottom wall panel providing a load supporting element at said one outer edge of said seat, a first flap attached to the other outer edge of said seat extending perpendicular thereto downward to said bottom wall panel and confined between the panels of the other of said two walls providing a load supporting element at said other edge of said seat, one of the panels of one of said two walls having a flap attached to an end thereof extending about the corner and confined between the panels of the other of said two walls, said last mentioned flap underlying said seat and extending therefrom to said bottom wall panel providing a load supporting element for said seat and being effective in cooperation with said first flap and its confining wall panels for tieing said walls together at said corner and thereby restraining them against relative outward movement, the inner panel of the other of said two walls having a flap extending beneath the corner seat and contacting the latter and the bottom wall panel providing an additional load supporting element, the inner and outer panels of said end wall providing between said seats two load supporting elements extending to said bottom wall panel.

*9. In a load supporting corner construction for a substantially rectangular open top stacking tray formed from a one piece blank of sheet material such as paper board and having a bottom wall panel and two opposite end walls and two opposite side walls extending upward from said bottom wall panel, said walls each comprising an outer panel and an inner panel joined together at their upper edges by a fold strip and said inner panel extending to and having interlocking engagement with said bottom wall panel effective for restraining said inner panel*

*against movement away from its associated outer panel, the end portions of said side walls being of approximately the same height as said end walls and the height of the intermediate portions of said side walls between said end portions thereof being substantially less than that of said end walls whereby said end walls bear the load of the superposed trays of a stack of trays, two of said walls comprising an end wall and a side wall being disposed substantially perpendicular to each other and defining a corner between them, a first flap hingedly attached to an end of one of the panels of one of said walls, a corner seat hingedly attached at one outer edge to one of said first flap and said one panel and extending perpendicular thereto in a substantially horizontal plane above the fold strip of the side wall, a second flap hingedly attached to another outer edge of said corner seat and extending perpendicular thereto downward to said bottom wall panel to provide a load supporting element for said seat, a third flap hingedly attached to an end of one of the panels of the other of said walls, said first and third flaps being of a height substantially greater than that of said intermediate portions of said side walls and approximately the same as that of said end walls and respectively extending around said corner and being confined between the panels of the wall adjacent the wall of the panel to which it is attached to tie the walls together at said corner, said first and third flaps extending between said seat and said bottom wall panel, said second flap being confined for substantially its full height between said third flap and the outer panel of the wall between the panels of which said third flap is confined, said flaps and panels together providing at each outer edge of said seat at least two thicknesses of paper board extending between said seat and said bottom wall panel and constituting load supporting elements of at least double thickness for each outer edge of said seat.*

References Cited in the file of this patent or the original patent

UNITED STATES PATENTS

| | | |
|---|---|---|
| 1,225,705 | Dyson | May 8, 1917 |
| 2,125,813 | Roscoe | Aug. 2, 1938 |
| 2,232,632 | Reynolds | Feb. 18, 1941 |
| 2,450,419 | Cassidy | Oct. 5, 1948 |
| 2,568,204 | Reeser | Sept. 18, 1951 |
| 2,594,628 | Evans | Apr. 29, 1952 |
| 2,719,665 | Tharpe | Oct. 4, 1955 |
| 2,728,485 | Howard | Dec. 27, 1955 |
| 2,777,627 | Crane | Jan. 15, 1957 |